United States Patent
Lane

(10) Patent No.: US 10,143,184 B1
(45) Date of Patent: Dec. 4, 2018

(54) HANDS-FREE DOG LEASH SYSTEM

(71) Applicant: Matthew Lane, Mason, NH (US)

(72) Inventor: Matthew Lane, Mason, NH (US)

(*) Notice: Subject to any disclaimer, the term of this patent is extended or adjusted under 35 U.S.C. 154(b) by 259 days.

(21) Appl. No.: 15/263,568

(22) Filed: Sep. 13, 2016

(51) Int. Cl.
*A01K 27/00* (2006.01)

(52) U.S. Cl.
CPC .................. *A01K 27/003* (2013.01)

(58) Field of Classification Search
CPC .. A01K 27/003; A01K 27/005; A01K 27/004; A01K 27/00; A45F 5/021
See application file for complete search history.

(56) References Cited

U.S. PATENT DOCUMENTS

| | | | |
|---|---|---|---|
| 3,458,188 A * | 7/1969 | Infante | G09B 19/0015 182/4 |
| 3,579,745 A * | 5/1971 | Wilson | A45F 5/02 24/307 |
| 3,868,786 A * | 3/1975 | Lippe | A01K 27/001 446/28 |
| 4,945,861 A * | 8/1990 | de Koning | A01K 27/00 119/795 |
| 5,080,045 A | 1/1992 | Reese | |
| D407,866 S | 4/1999 | Perrulli | |
| 5,950,569 A | 9/1999 | Perrulli | |
| 6,192,835 B1 * | 2/2001 | Calhoun | A01K 27/00 119/792 |
| 7,467,604 B1 | 12/2008 | Werner | |
| 8,622,028 B2 | 1/2014 | Ekstrum | |
| 9,561,776 B2 * | 2/2017 | Friedman | B60N 2/2812 |
| 2007/0012262 A1 | 1/2007 | Cole | |
| 2013/0042818 A1 | 2/2013 | Capoano | |
| 2013/0042819 A1 * | 2/2013 | Ekstrum | A01K 27/00 119/770 |
| 2015/0013619 A1 * | 1/2015 | Kahana, Jr. | A01K 1/04 119/770 |

* cited by examiner

*Primary Examiner* — Kristen C Hayes
(74) *Attorney, Agent, or Firm* — Kyle A. Fletcher, Esq.

(57) ABSTRACT

The hands-free dog leash system is an anchoring system that is adapted for use with a belt that is worn by an individual. The hands-free dog leash system is further adapted for use with a tether. The tether is attached to the hands-free dog leash system to anchor the tether to the belt. Tethers attached to the hands-free dog leash system remain with the belt and will not be separated from the individual. Tethers attached to the hands-free dog leash system more robustly handle unexpected forces that are delivered through the tether than hand carried tethers. The hands-free dog leash system comprises one or more tether units. Multiple tether units can be interconnected to form a larger single unit.

17 Claims, 3 Drawing Sheets

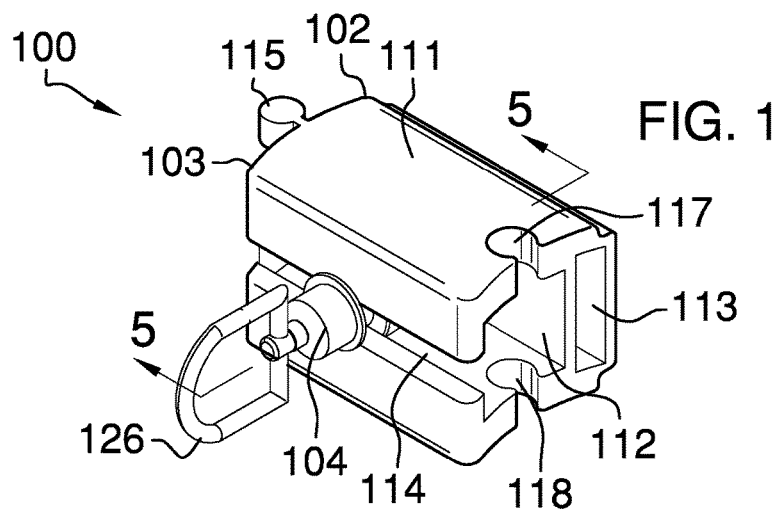
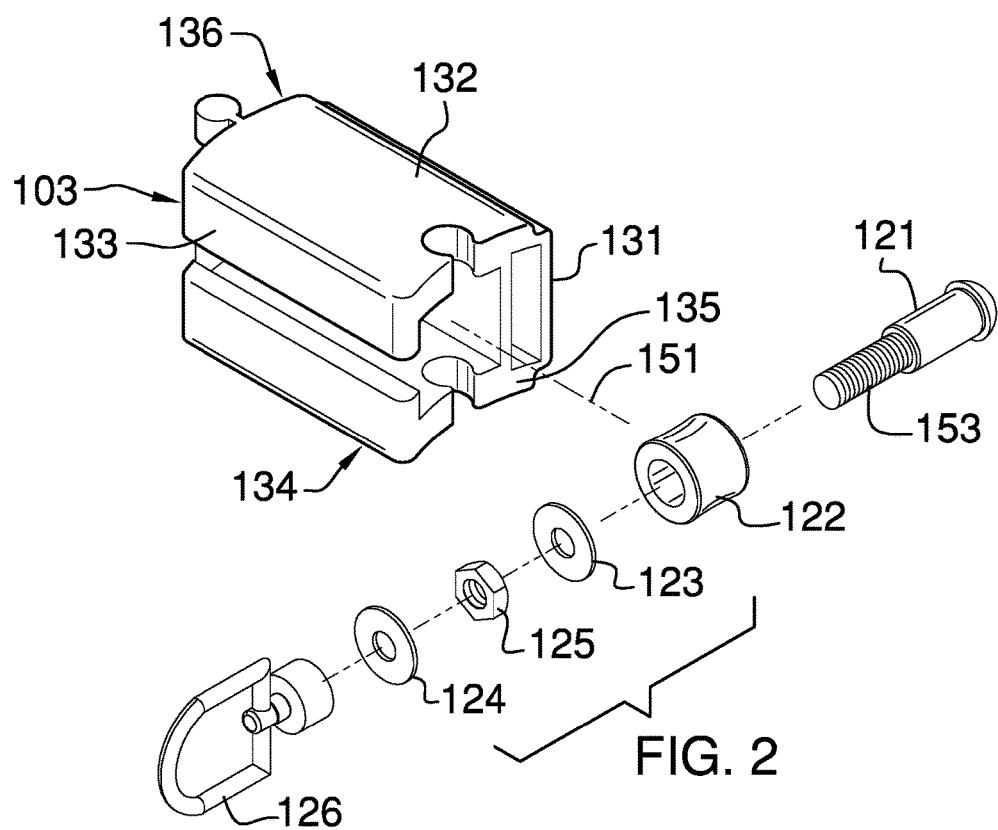

HANDS-FREE DOG LEASH SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of animal husbandry, more specifically, a lead anchor adapted for use with dogs.

SUMMARY OF INVENTION

The hands-free dog leash system is an anchoring system that is adapted for use with a belt that is worn by an individual. The hands-free dog leash system is further adapted for use with a tether. The tether is attached to the hands-free dog leash system to anchor the tether to the belt. Tethers attached to the hands-free dog leash system remain with the belt and will not be separated from the individual. Tethers attached to the hands-free dog leash system more robustly handle unexpected forces that are delivered through the tether than hand carried tethers. The hands-free dog leash system comprises one or more tether units. Multiple tether units can be interconnected to form a larger single unit.

These together with additional objects, features and advantages of the hands-free dog leash system will be readily apparent to those of ordinary skill in the art upon reading the following detailed description of the presently preferred, but nonetheless illustrative, embodiments when taken in conjunction with the accompanying drawings.

In this respect, before explaining the current embodiments of the hands-free dog leash system in detail, it is to be understood that the hands-free dog leash system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hands-free dog leash system.

It is therefore important that the claims be regarded as including such equivalent construction insofar as they do not depart from the spirit and scope of the hands-free dog leash system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a perspective view of an embodiment of the disclosure.

FIG. 2 is an exploded view of an embodiment of the disclosure.

DETAILED DESCRIPTION OF THE EMBODIMENT

Figure 3:
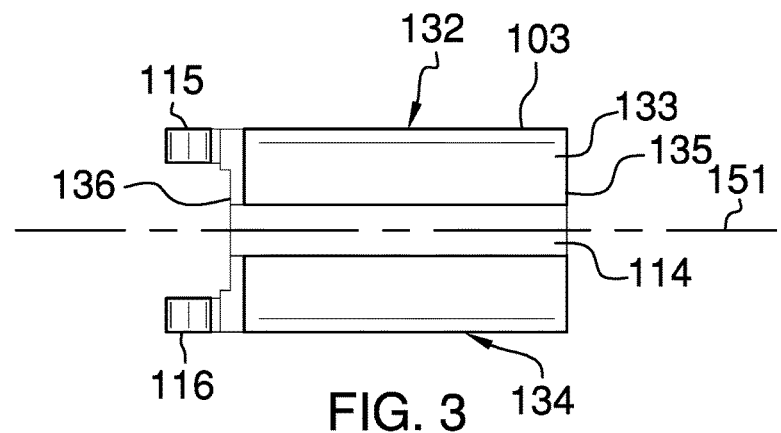
FIG. 3 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The hands-free dog leash system 100 (hereinafter invention) comprises one or more tether units 101. The invention 100 is an anchoring system that is adapted for use with a belt 143 that is worn by an individual. The invention 100 is further adapted for use with a tether 141. The tether 141 is attached to the invention 100 to anchor the tether 141 to the belt 143. A tether 141 attached to the invention 100 remains with the belt 143 and will not be separated from the belt 143 while the belt 143 is worn by an individual. A tether 141 attached to the invention 100 more robustly handles unexpected forces that are delivered through the tether 141 than hand carried tethers 141. Multiple tether units selected from the one or more tether units 101 can be interconnected to form a larger single unit capable of handling multiple tethers 141.

Each individual tether unit 102 selected from the one or more tether units 101 is identical to any tether units remaining in the one or more tether units 101. Each individual tether unit 102 further comprises a rail 103 and a leash ring 104. The rail 103 is the anchor point of the individual tether unit 102. The rail 103 is the portion of the individual tether unit 102 that is attached to the belt 143. The leash ring 104 is removably attached to the rail 103. The leash ring 104 disconnects from the rail 103 by sliding out of the rail 103. The leash ring 104 is then reattached to the rail 103 by sliding the leash ring 104 into the rail 103.

The rail 103 comprises a block 111. The block 111 is further formed with a master channel 112, a belt channel 113, a slide channel 114, a first jigsaw projection 115, a second jigsaw projection 116, a first jigsaw interconnection 117, and a second jigsaw interconnection 118. The block 111 is a rectangular block structure that is further defined with a first side 131, a second side 132, a third side 133, a fourth side 134, a fifth side 135, and a sixth side 136. The first side 131 of the block 111 is the side that is proximal to the belt 143. The second side 132 of the block 111 is the side that is distal from the surface supporting the user when the invention 100 is worn normally. The third side 133 of the block 111 is the side that is distal from the first side 131. The fourth side 134 of the block 111 is the side that is distal from the second side 132. When the invention 100 is viewed directly from the second side 132, the side locations, in clockwise order are the first side 131, the sixth side 136, the third side 133, and the fifth side 135.

The master channel 112 is an aperture that is formed through the block 111 from the fifth side 135 to the sixth side 136 in the shape of a first rectangular block. The master channel 112 follows along a first hypothetical axis 151 that runs perpendicular to the fifth side 135, through the center of the block 111 and intersects perpendicularly with the sixth side 136. The first hypothetical axis 151 is fully contained within the master channel 112.

As shown most clearly in FIGS. 1 and 2, the master channel 112 merges with the slide channel 114. The slide channel 114 is a slot that is formed in the third side 133 of the block 111 such that the master channel 112 can be accessed through the slide channel 114. The slide channel 114 is positioned such that when the third side 133 is viewed directly, the first hypothetical axis 151 will appear to bisect the slide channel 114. The purpose of the master channel 112 is to receive a portion of the leash ring 104. The purpose of the slide channel is to provide an opening that allows a portion of the leash ring 104 to slide into the master channel 112 while a portion of the leash ring 104 is accessible from the exterior of the block 111.

As shown most clearly in FIG. 1, when it is said that the leash ring 104 slides into and out of the block 111 what is specifically meant is that a portion of the leash ring 104 is slid into master channel 112 from the fifth side 135 or the sixth side 136 of the block 111 while, simultaneously, a portion of the leash ring 104 remains on the exterior of the block 111 by projecting through the opening created by the slide channel 114. The slide channel 114 is sized such that any forces applied to the leash ring 104 in a direction perpendicular to the first hypothetical axis 151 will not be able to dislodge the leash ring 104 through the slide channel 114. The belt channel 113 is an aperture that is formed through the block 111 from the fifth side 135 to the sixth side 136 in the shape of a second rectangular block. The interior surfaces of the belt channel 113 run parallel to the first hypothetical axis 151. The purpose of the belt channel 113 is to receive the belt 143 such that when the belt is secured to an individual then the block 111 will not be removed from the belt 143. In normal use, the belt 143 is inserted through the belt channel 113.

As shown most clearly in FIG. 3, the first jigsaw projection 115 is a tab structure that projects away from the sixth side 136 of the block 111 such that the surface of the second side 132 of the block 111 extends beyond the sixth side 136 of the block 111. The second jigsaw projection 116 is a tab structure that projects away from the sixth side 136 of the block 111 such that the surface of the fourth side 134 of the block 111 extends beyond the sixth side 136 of the block 111. The significance of the tab structure of the first jigsaw projection 115 and the tab structure second jigsaw projection 116 is discussed in the next paragraph. The first jigsaw interconnection 117 is a blank structure that is removed from the second side 132 of the block 111 such that the first jigsaw projection 115 can be inserted into the first jigsaw interconnection 117. The second jigsaw interconnection 118 is a blank structure that is removed from the fourth side 134 of the block 111 such that the second jigsaw projection 116 can be inserted into the second jigsaw interconnection 118. The significance of the blank structure of the first jigsaw interconnection 117 and the blank structure second jigsaw interconnection 118 is discussed in the next paragraph.

When the one or more tether units 101 comprise more than one individual tether unit 102, each of the one or more tether units 101 can be connected to each other using the tab structure and the blank structure described in the prior paragraph. The terms tab and blank are commonly used when working with interlocking jigsaw puzzles and these terms are indicative of how the interconnection between two or more individual tether units 102 will work. Specifically, the first jigsaw projection 115 is inserted into the first jigsaw interconnection 117 in the same manner that two pieces of a jigsaw puzzle would be interconnected. The second jigsaw projection 116 is inserted into the second jigsaw interconnection 118 in the same manner that two pieces of a jigsaw puzzle would be interconnected. By interconnecting a first individual tether unit 161 to a second individual tether unit 162 in this fashion, the invention 100 can be expanded to receive additional leash rings 104 allowing the connection of multiple tethers 141 to the invention 100.

The leash ring 104 comprises a wheel bolt 121, an elastomeric ring 122, a first washer 123, a second washer 124, a nut 125, and a single eye swivel ring 126. Each of the above components are commercially available. The single eye swivel ring 126 used in this disclosure is a metal loop that is attached to a pin such that the loop can rotate using the pin as the center of rotation. This rotation allows the leash ring 104 for release the strain caused by the forces of variable direction that the tether 141 subjects to the leash ring 104. The single eye swivel ring 126 further comprises an interior screw thread 152 that is sized to receive the exterior screw thread 153 of the wheel bolt 121. The function of the elastomeric ring 122 is to protect the wheel bolt 121 from potential damage caused by the block 111. The elastomeric ring 122 is made from an elastomeric material that deforms when subjected to a force and then returns to its original shape when the force is removed.

Figure 4:
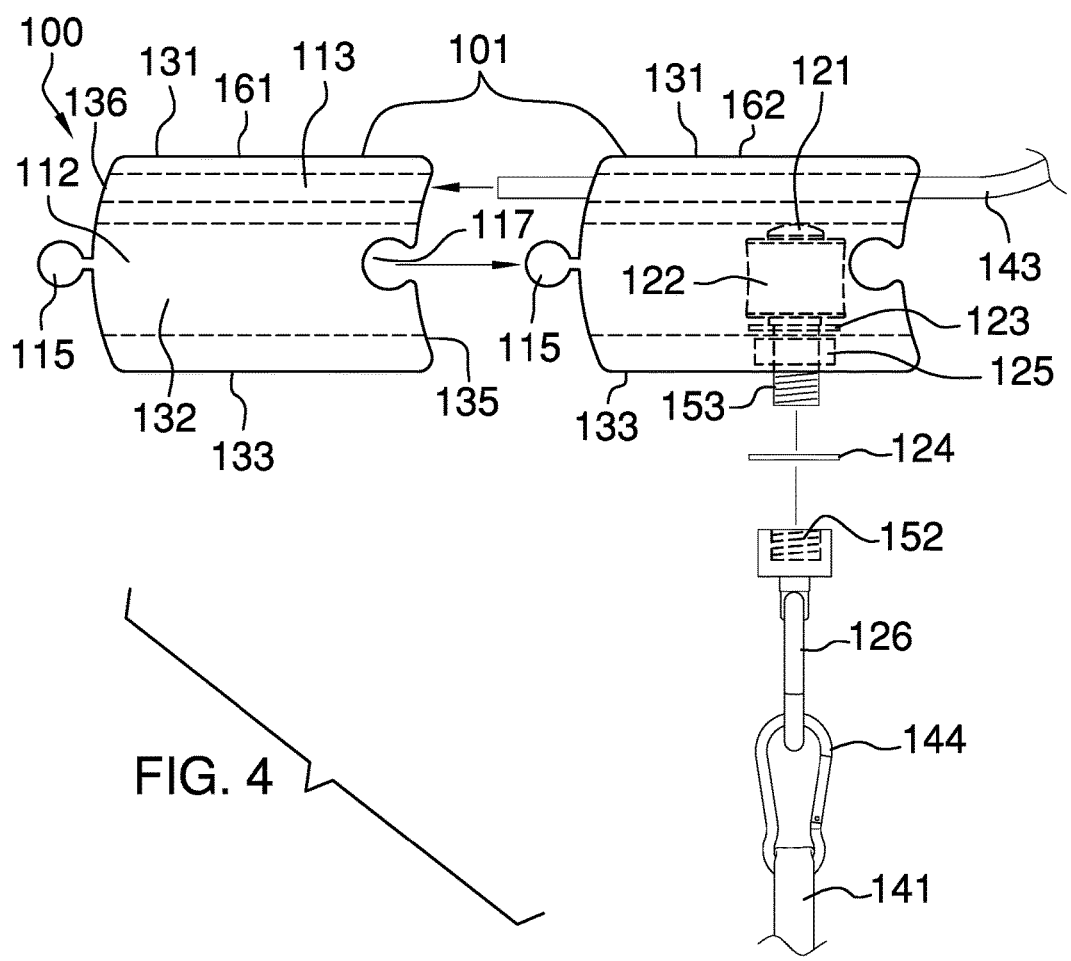
FIG. 4 is a top view of an embodiment of the disclosure.
Figure 5:
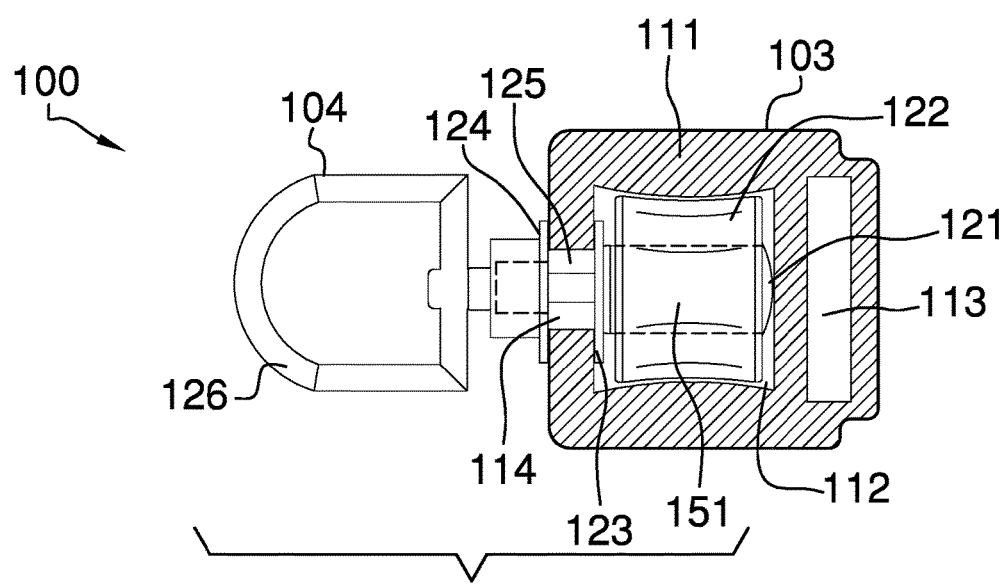
FIG. 5 is a cross-sectional view of an embodiment of the disclosure across 5-5 as shown in FIG. 1.

As shown most clearly in FIGS. 2 and 4, the leash ring 104 is assembled by sliding the elastomeric ring 122 over the wheel bolt 121. The first washer 123 is then slid over the wheel bolt 121 such that the first washer 123, as shown in FIG. 4, rests against the elastomeric ring 122. The nut 125 is then screwed onto the wheel bolt 121 to secure the elastomeric ring 122 and the first washer 123 in position. The nut 125 is positioned in the master channel 112 such that the nut 125, the first washer 123 and the elastomeric ring 122 will fit within the master channel 112 while the wheel bolt 121 projects through the slide channel 114. When the nut 125, the first washer 123 and the elastomeric ring 122 and the wheel bolt 121 are inserted into the master channel 112 and the slide channel 114 as described in the previous sentence, the nut 125, the first washer 123, the elastomeric ring 122 and the wheel bolt 121 can be secured into position by placing the second washer 124 over the wheel bolt 121 and securing the assembly by screwing the single eye swivel ring 126 onto the wheel bolt 121. The leash ring 104 is tightened hand tight such that the leash ring 104 can be slid along the slide channel 114.

To use the invention 100, a belt 143 is inserted through the belt channel 113 and is then attached to an individual or object. The leash ring 104 is inserted into the master channel 112 and the slide channel 114 as described in the previous paragraph. The tether 141 is then attached to the single eye swivel ring 126 using a carabiner 144, a loop knot, or a hitching knot. To manually hold the tether 141, the leash ring 104 is slid out of the rail 103. The leash ring 104 may be returned to the rail 103 in the reverse manner. Multiple individual tether units 102 may be installed on the same belt 143 in order to accommodate multiple tethers 141. The multiple rails 103 are interconnected as described elsewhere in this disclosure. The multiple loop rings 104 are inserted into the end of the interconnected rails 103 and can be slid through each of the interconnected individual rails 103 as required.

The following definitions were used in this disclosure:

Carabiner: As used in this disclosure, a carabiner is coupling link that is usually formed as an oblong metal ring with one spring hinged side that is used to open and close the ring. Synonyms for carabiner include D-link.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center of Rotation: As used in this disclosure, the center of rotation is the point of a rotating plane that does not move with the rotation of the plane or a line within a rotating object that does not move with the rotation of the object.

Elastic: As used in this disclosure, an elastic is a material or object that deforms when a force is applied to it and that is able to return to its original shape after the force is removed. A material that exhibits these qualities is also referred to as an elastomeric material.

Exterior Screw Thread: An exterior screw thread is a ridge wrapped around the outer surface of a tube in the form of a helical structure that is used to convert rotational movement into linear movement.

Interior Screw Thread: An interior screw thread is a ridge wrapped around the inner surface of a tube in the form of a helical structure that is used to convert rotational movement into linear movement Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A lead anchor comprising:
one or more tether units;
wherein the lead anchor is an anchoring system;
wherein the lead anchor is adapted for use with a belt;
wherein the lead anchor is further adapted for use with a tether;
wherein a tether is attached to a one or more tether units;
wherein the one or more tether units is attached to a belt;
wherein a selected one from the one or more tether units is interconnected;
wherein each individual tether unit selected from the one or more tether units is identical to any tether units remaining in the one or more tether units;
wherein each individual tether unit further comprises a rail and a leash ring;
wherein the leash ring is removably attached to the rail;
wherein the leash ring is attached to the rail by sliding the leash ring into the rail.

2. The lead anchor according to claim 1
wherein the rail comprises a block;
wherein the block is a rectangular block structure;
wherein the block has further formed into it with a master channel, a belt channel, a slide channel, a first jigsaw projection, a second jigsaw projection, a first jigsaw interconnection, and a second jigsaw interconnection;
wherein the block is further defined with a first side, a second side, a third side, a fourth side, a fifth side, and a sixth side.

3. The lead anchor according to claim 2
wherein the master channel is an first aperture that is formed through the block from the fifth side to the sixth side;
wherein the first aperture that is formed in the shape of a first rectangular block;
wherein the master channel follows along a first axis that runs perpendicular to the fifth side, through the center of the block and intersects perpendicularly with the sixth side;
wherein the first axis is fully contained within the master channel.

4. The lead anchor according to claim 3
wherein the slide channel is a slot that is formed in the third side of the block;
wherein the master channel merges with the slide channel such that the master channel can be accessed through the slide channel.

5. The lead anchor according to claim 4 wherein the slide channel is positioned such that when the third side is viewed directly the first hypothetical axis will bisect the slide channel.

6. The lead anchor according to claim 5
wherein the master channel receives a first portion of the leash ring;
wherein the first portion of the leash ring is slid into master channel from a side selected from the group selected from the fifth side or the sixth side;
wherein when the first portion of the leash ring is slid into master channel then a second portion of the leash ring projects through the opening created by the slide channel.

7. The lead anchor according to claim 6
wherein the slide channel is sized such that the slide channel prevents any forces applied to the leash ring in a direction perpendicular to the first axis will not dislodge the leash ring.

8. The lead anchor according to claim 7
wherein the belt channel is an aperture that is formed through the block from the fifth side to the sixth side;
wherein the belt channel is formed in the shape of a second rectangular block.

9. The lead anchor according to claim 8
wherein an interior surface of the belt channel is parallel to the first axis.

10. The lead anchor according to claim 9
wherein the first jigsaw projection is a first tab structure that projects away from the sixth side of the block such that the surface of the second side of the block extends beyond the sixth side of the block;
wherein the first jigsaw interconnection is a first blank structure that is removed from the second side of the block;
wherein the first jigsaw interconnection is sized and shaped such that the first jigsaw projection can be inserted into the first jigsaw interconnection.

11. The lead anchor according to claim 10 wherein any first tether unit selected from the one or more tether units is attached to any second tether unit selected from the one or more tether units by inserting the first jigsaw projection into the first jigsaw interconnection.

12. The lead anchor according to claim 11
wherein the leash ring comprises a wheel bolt, an elastomeric ring, a nut, and a single eye swivel ring;
wherein the elastomeric ring slides over the wheel bolt;
wherein the nut screws onto the wheel bolt;
wherein the nut is positioned in the master channel such that the nut and the elastomeric ring fit within the master channel while the wheel bolt projects through the slide channel.

13. The lead anchor according to claim 12
wherein the single eye swivel ring further comprises an interior screw thread;
wherein the wheel bolt further comprises an exterior screw thread;
wherein the interior screw thread is sized to receive the exterior screw thread;
wherein the single eye swivel ring is screwed onto the wheel bolt.

14. The lead anchor according to claim 11
wherein the second jigsaw projection is a second tab structure that projects away from the sixth side of the block such that the surface of the second side of the block extends beyond the sixth side of the block;
wherein the second jigsaw interconnection is a second blank structure that is removed from the second side of the block;
wherein the second jigsaw interconnection is sized and shaped such that the second jigsaw projection can be inserted into the second jigsaw interconnection.

15. The lead anchor according to claim 14 wherein the first tether unit selected from the one or more tether units is attached to the second tether unit selected from the one or more tether units by inserting the second jigsaw projection into the second jigsaw interconnection.

16. The lead anchor according to claim 15
wherein the leash ring comprises a wheel bolt, an elastomeric ring, a nut, and a single eye swivel ring;
wherein the elastomeric ring slides over the wheel bolt;
wherein the nut screws onto the wheel bolt;
wherein the nut is positioned in the master channel such that the nut and the elastomeric ring fit within the master channel while the wheel bolt projects through the slide channel.

17. The lead anchor according to claim 16
wherein the single eye swivel ring further comprises an interior screw thread;
wherein the wheel bolt further comprises an exterior screw thread;
wherein the interior screw thread is sized to receive the exterior screw thread;
wherein the single eye swivel ring is screwed onto the wheel bolt.

\* \* \* \* \*